US012584332B2

(12) United States Patent
Cunefare et al.

(10) Patent No.: US 12,584,332 B2
(45) Date of Patent: Mar. 24, 2026

(54) DISPENSER LATCHING SYSTEM

(71) Applicant: Kimberly-Clark Worldwide, Inc., Neenah, WI (US)

(72) Inventors: Kenneth A. Cunefare, Atlanta, GA (US); Darren Micah Maguire, Midland, TX (US); Annabelle Faith Mathis, Atlanta, GA (US); Hannah Margaret Ubersox, Lake Orion, MI (US); Natalie Claire Schaeffer, Western Springs, IL (US); Dow Copeland Shelnutt, Atlanta, GA (US); Hunter Dorsey Ubersox, Lake Orion, MI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 694 days.

(21) Appl. No.: 17/311,281

(22) PCT Filed: Dec. 4, 2019

(86) PCT No.: PCT/US2019/064504
§ 371 (c)(1),
(2) Date: Jun. 4, 2021

(87) PCT Pub. No.: WO2020/117956
PCT Pub. Date: Jun. 11, 2020

(65) Prior Publication Data

US 2022/0018159 A1 Jan. 20, 2022

Related U.S. Application Data

(60) Provisional application No. 62/775,276, filed on Dec. 4, 2018.

(51) Int. Cl.
*A47K 10/32* (2006.01)
*A47K 5/12* (2006.01)
(Continued)

(52) U.S. Cl.
CPC ............ *E05B 47/0045* (2013.01); *A47K 5/12* (2013.01); *A47K 10/32* (2013.01); *E05B 65/006* (2013.01);
(Continued)

(58) Field of Classification Search
CPC .. E05B 47/0045; E05B 47/004; E05B 65/006; A47K 5/12; A47K 10/24;
(Continued)

(56) References Cited

U.S. PATENT DOCUMENTS 5,485,733 A 1/1996 Hoffman
8,522,400 B1 9/2013 Jablonski
(Continued)

FOREIGN PATENT DOCUMENTS

CN 101184678 A 5/2008
CN 101298816 A 11/2008
(Continued)

*Primary Examiner* — Kristina R Fulton
*Assistant Examiner* — Thomas L Neubauer
(74) *Attorney, Agent, or Firm* — KIMBERLY-CLARK WORLDWIDE, INC.

(57) ABSTRACT

A dispenser comprising a body with a front side and a back side with the front side movably attached to the back side by a hinge, wherein the hinge includes pin receiving openings and the hinge is configured to move the front side between an open position and a closed position; and a locking device including pins and a pin housing for each of the pins and being configured to allow respective movement of the pins between a first pin position and a second pin position; and a dispenser key configured to magnetically move the pins from the first pin position to the second pin position to allow the front side to move from the closed position to the open position.

11 Claims, 7 Drawing Sheets

(51) Int. Cl.
*E05B 47/00* (2006.01)
*E05B 65/00* (2006.01)
*E05D 11/10* (2006.01)

(52) U.S. Cl.
CPC .. *E05D 11/1007* (2013.01); *A47K 2010/3246* (2013.01); *E05Y 2201/22* (2013.01); *E05Y 2900/20* (2013.01)

(58) Field of Classification Search
CPC ............ A47K 10/32; A47K 2010/3233; A47K 2010/00; E05D 11/1007; E05Y 2201/22; E05Y 2900/20
See application file for complete search history.

(56) References Cited

U.S. PATENT DOCUMENTS

| | | | | |
|---|---|---|---|---|
| 8,863,563 | B2 * | 10/2014 | Gentile | E05B 47/0038 70/57.1 |
| 10,112,745 | B2 * | 10/2018 | Foshansky | E05D 11/0054 |
| 2008/0012359 | A1 | 1/2008 | Aschieri | |
| 2009/0120950 | A1 | 5/2009 | Titas et al. | |
| 2009/0302721 | A1 | 12/2009 | Unger | |
| 2011/0168831 | A1 | 7/2011 | Mok et al. | |
| 2014/0203133 | A1 | 7/2014 | Andersson et al. | |

FOREIGN PATENT DOCUMENTS

| | | | |
|---|---|---|---|
| CN | 101522086 | A | 9/2009 |
| CN | 102177304 | A | 9/2011 |
| CN | 102458203 | A | 5/2012 |
| CN | 205597837 | U | 9/2016 |
| KR | 101874914 | B1 | 7/2018 |

* cited by examiner

DISPENSER LATCHING SYSTEM

This application claims priority from U.S. provisional Patent Application Ser. No. 62/775,276 filed on 4 Dec. 2018, the entire contents of which are incorporated herein by reference.

TECHNICAL FIELD

This disclosure generally relates to dispensers for dispensing consumable products.

BACKGROUND OF THE DISCLOSURE

Dispensers for consumable products are common in many environments. For example, paper hand towel and bath tissue dispensers are in many private, semi-private and public washrooms, and sanitizer dispensers are found in many work areas, food processing stations and kitchens. From time-to-time these dispensers need to be serviced whether due to low or no product left in the dispenser or due to a malfunction or vandalism. Often such servicing requires access to the interior of the dispenser by opening a door or cover of the dispenser.

Many dispensers include locks on the door or cover to prevent unauthorized access to the dispenser, e.g., to prevent tampering with the dispenser or unauthorized removal of the consumable product in the dispenser. However, these locks are often easy to pick or force open. Installing traditional, robust locks is typically not an option given the cost of such locks. Accordingly, there is a need for a robust locking mechanism well suited for use in dispensers for consumable products.

SUMMARY OF THE DISCLOSURE

In general, the subject matter of this specification relates to a dispenser, e.g., a consumable product dispenser. One aspect of the subject matter described in this specification can be implemented in a dispenser system for dispensing consumable product comprising a body including a front side and a back side with the front side movably attached to the back side by a hinge, wherein the hinge includes one or more pin receiving openings and the hinge is configured to move the front side between an open position and a closed position; and a locking device including one or more pins and a pin housing for each of the one more pins and being configured to hold the one or more pins in spaced relation (to each other) and allow respective movement of the one or more pins between a first pin position and a second pin position; and wherein when in the closed position the one or more pins are in the first pin position and engage the one or more pin receiving openings in the hinge and when in the open position the one or more pins are in the second pin position and do not engage the one or more pin receiving openings in the hinge; and a dispenser key configured to magnetically move the one or more pins from the first pin position to the second pin position to allow the front side to move from the closed position to the open position. Other embodiments of this aspect include corresponding methods and apparatus.

Another aspect of the subject matter described in this specification can be implemented in a method that includes magnetically coupling a dispenser key to a locking device in the dispenser through an exterior of the dispenser to move pins in the locking device from a first pin position in which the pins engage a hinge on a door of the dispenser to a second pin position in which the pins do not engage the hinge; and opening the door of the dispenser. Other embodiments of this aspect include corresponding systems and apparatus.

Particular embodiments of the subject matter described in this specification can be implemented so as to realize one or more of the following advantages. For example, a cost effective, magnetically-based key is used, from the outside of the dispenser, to actuate a locking mechanism on the inside of the dispenser to open the dispenser. So there are no external locks for a violator to try to pick, which makes the dispenser more secure.

Further, as the locking mechanism is internal to the dispenser, as opposed to a key hole on the outside of traditional dispensers, there are fewer dirt traps on the dispenser, which promotes a more sanitary and hygienic dispenser.

The details of one or more implementations of the subject matter described in this specification are set forth in the accompanying drawings and the description below. Other features, aspects, and advantages of the subject matter will become apparent from the description, the drawings, and the claims.

Figure 1:
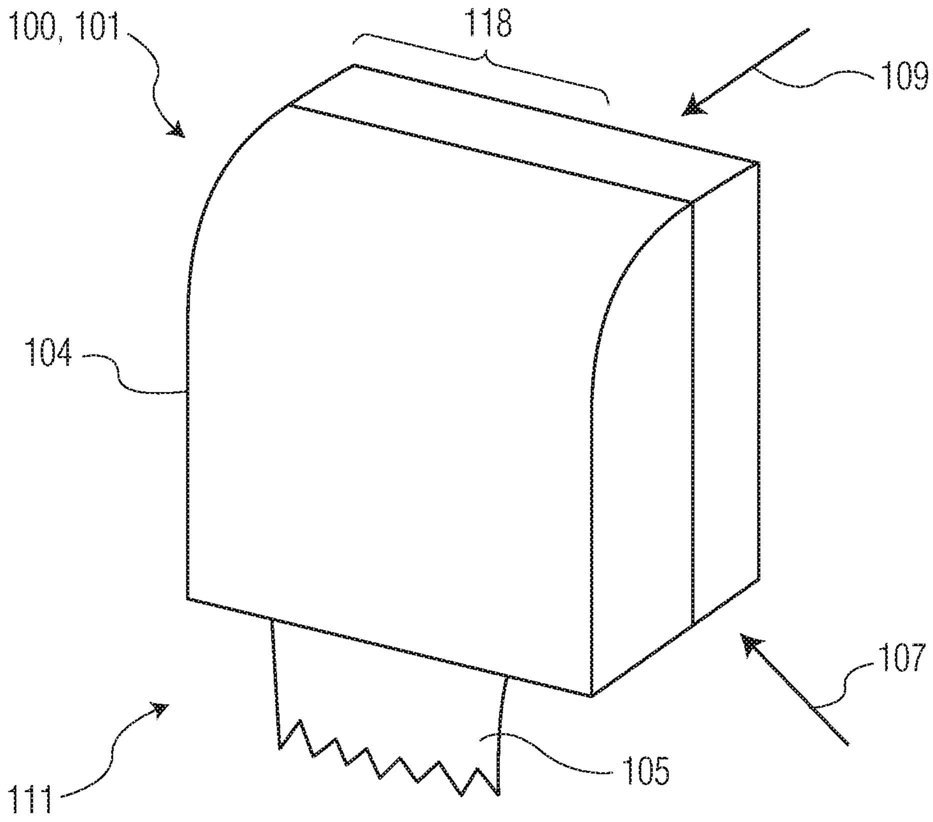
FIG. 1 is a perspective representation of an example dispenser system.

Repeat use of reference characters in the present specification and drawings is intended to represent the same or analogous features or elements of the disclosure.

DETAILED DESCRIPTION OF THE DISCLOSURE

The present disclosure relates to a dispenser having an entirely internal locking mechanism that can be locked and unlocked, from outside the dispenser, without physical contact between the key and the locking mechanism. More particularly, the dispenser includes a locking mechanism/device that includes one or more ferrous pins that slide in and out of a pin housing where the pin housing is located close to an exterior wall of the dispenser but within the dispenser. When the dispenser door is closed the pins engage a hinge that moves the door between its open and closed positioned. With the pins engaged to the hinge the hinge is prevented from opening the door, i.e., it locks the door closed.

To disengage the pins and release the hinge to open the door, a magnetic key is placed at or near the exterior wall of the dispenser proximate the locking device. The key includes, for example, a magnet which attracts the ferrous pins and draws the pins away from the hinge thereby freeing the hinge to rotate and open the door. A dispensing system with this functionality is described in more detail below with reference to FIG. 1, which is a perspective representation of an example dispenser system 100.

Figure 5:
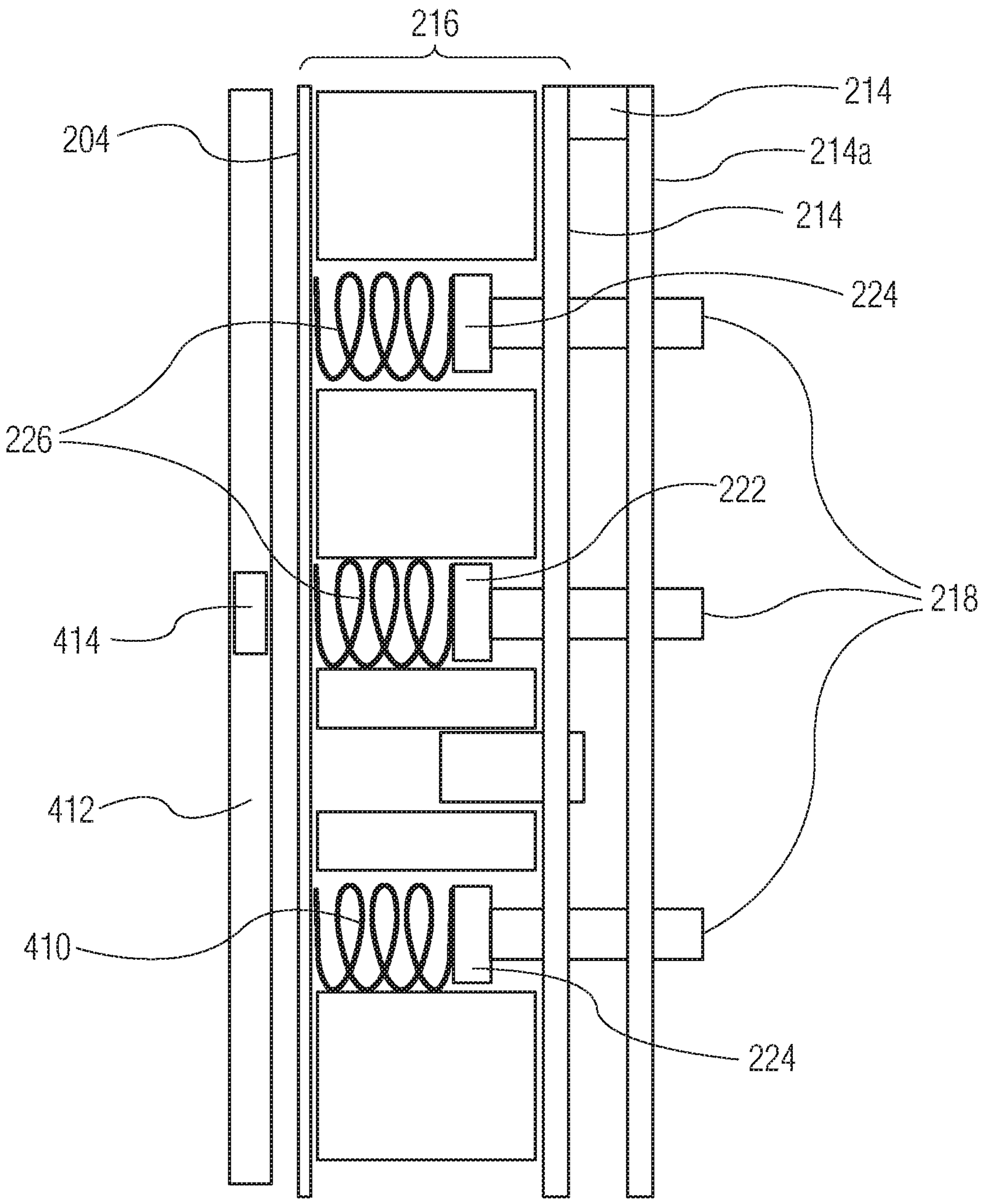
FIG. 5 is a cross-sectional representation of an example locking device and an example dispenser key.

The dispenser system 100 includes a dispenser 101 and a dispenser key 410 (as shown in FIG. 5). The dispenser 101 can be, for example, a hand towel dispenser, bath tissue dispenser, liquid soap dispenser, wiper dispenser, sanitizer dispenser, fragrance dispenser or the like. The dispenser 101, more generally, is a device that holds consumable product 105 and dispenses the consumable product in response to a stimulus, e.g., a user or environmental stimulus, or at pre-determined (e.g., programmatically) set intervals. The dispenser 101 includes a body 104, e.g., a composite, polymeric or metal housing. The body 104 encloses, fully or partially, a product holding area that holds consumable product 105, for example, paper towels (rolled and folded), bath tissue, wipes/wipers, liquid soap or sanitizer, lotion, deodorizer, etc.

In some implementations, for example, for consumable product 105 such as rolled hand towels or bath tissue, the product holding area can be accessed by rotating a front side 111 of the body 104 away from a back side 109 (e.g., the wall mounted side) by a hinge as described below.

Figure 2A:
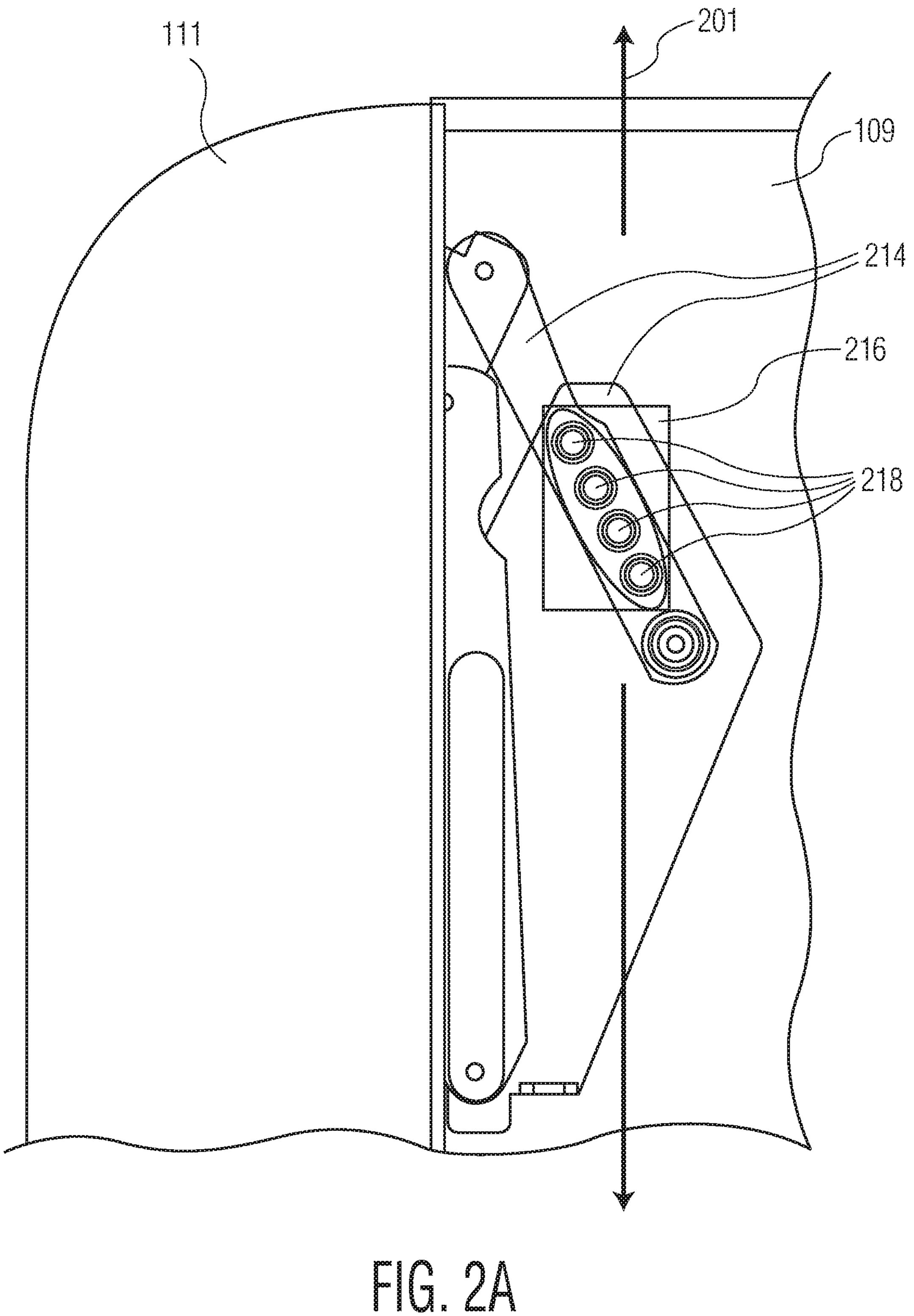
FIG. 2A is a side cutaway representation of the example dispenser system in a closed position.
Figure 2B:
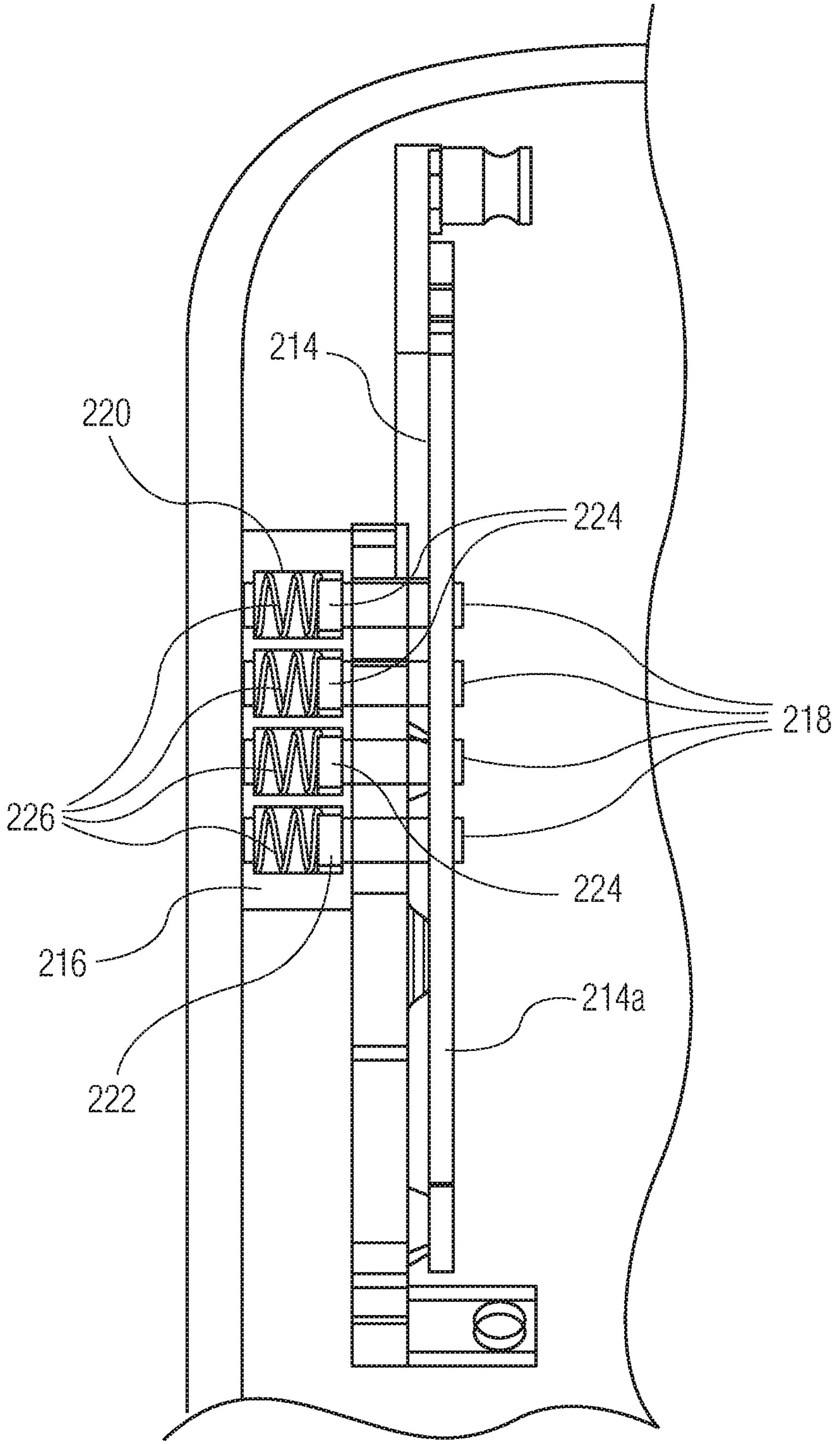
FIG. 2B is a partial front cutaway representation of the example dispenser system of FIG. 2A.
Figure 3A:
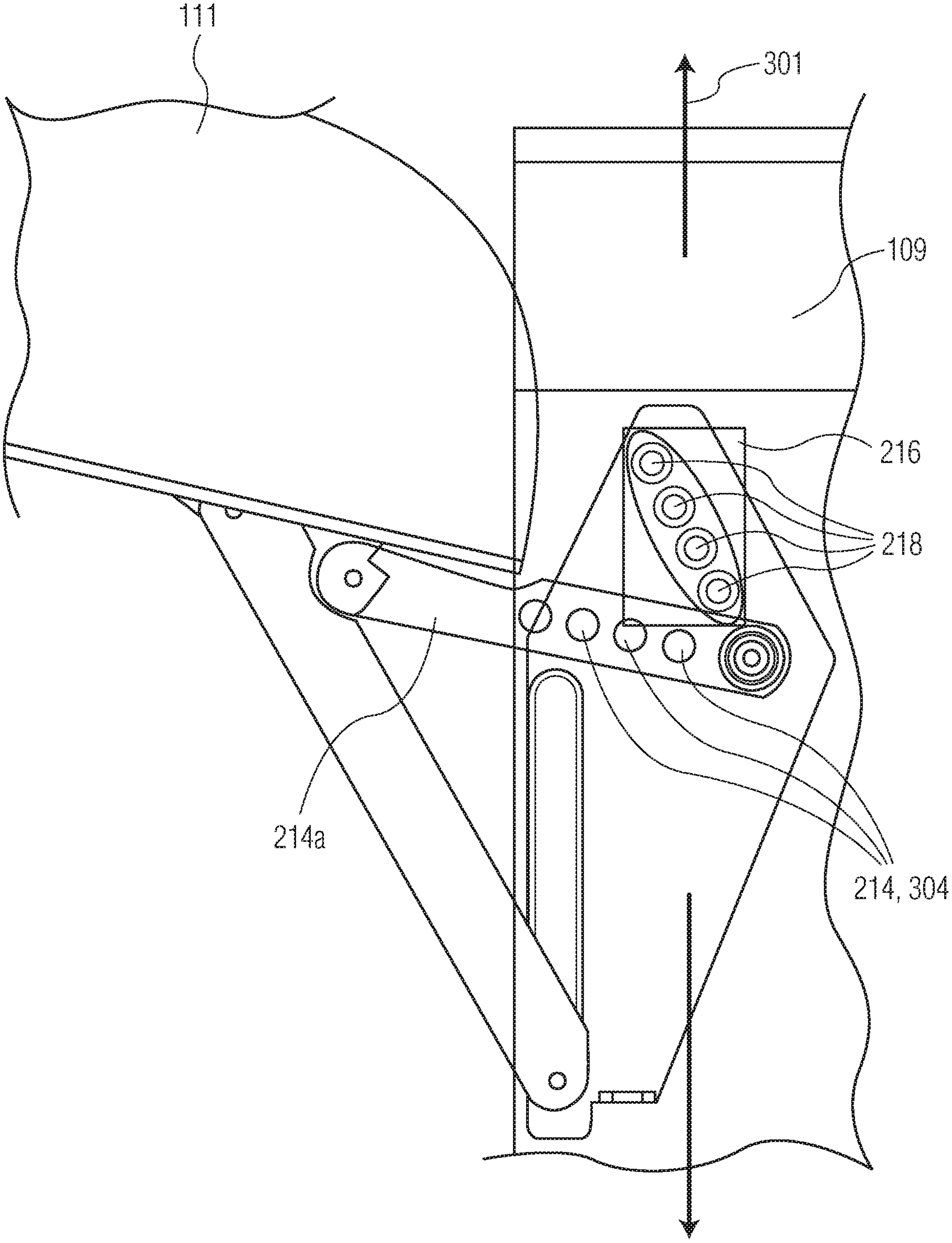
FIG. 3A is a side cutaway representation of the example dispenser system in an open position.

FIG. 2A is a side cutaway representation (with respect to direction 107) of the example dispenser system 100 in a closed position, and FIG. 2B is a partial front cutaway representation of the example dispenser system 100 of FIG. 2A (taken in the vicinity of line 201 on the left side 118 of the dispenser 101). The dispenser 101 includes a hinge 214. The hinge 214 is coupled to the body 104, and operates to move the front side 111 between an open position (as shown in FIG. 3A) and a closed position (as shown in FIG. 2A). In some implementations, the hinge 214 is attached to both the front side 111 and the back side 109 and pivots the front side 111 away from the back side 111 (e.g., in a clam shell type process) to allow access to the consumable product 105 in the dispenser 101. In other implementations, the hinge 214 can allow the front side 111 to drop down and slide away (e.g., on vertically oriented tracks) from the back side 109. More generally, the hinge 214 facilitates opening and closing an access point to the interior of the dispenser 101.

The dispenser 101 includes a locking device 216. The locking device 216 prevents (or permits) the hinge 214 from opening the dispenser 101 (e.g., from moving the front side 111 to the open position). In some implementations, the locking device 216 is entirely contained inside the body 104 such that it is not externally accessible other than when the front side 111 is in the open position (excluding any opening through which the consumable product 105 is dispensed or other openings not intended for use to access the locking device 216).

To control the actuation of the hinge 214 the locking device 216 includes one or more pins 218 and a pin housing 220 for each (all) of the pins 218. In some implementations, the pins 218 are elongated cylinders or square tubes. And the pin housing 220 is shaped to accept the pin 218 and allow the pin 218 to slide in and (partially) out of the housing 220 between a first pin position and a second pin position. In some implementations with multiple pins 218, the pin housing(s) 220 hold the pins 218 in spaced relation (as shown in FIGS. 2A and 2B).

In some implementations, the locking device 216 includes a resilient member 226 in the pin housing 220 (e.g., in each pin housing 220). The resilient member 226 biases the pin 218 towards the first pin position such that without external forces the resilient member 226 will hold the pin 218 in the first pin position. For example, the resilient member 226 can be a (coiled) spring 226. In some implementations, the resilient member 226 is positioned in the pin housing 220 between the pin 218 and an end of the pin housing 220 closest to the exterior wall of the dispenser 101, and pushes the pin 218 (and, optionally, the magnet 224 or ferromagnetic material 222) toward the center of the dispenser 101.

The pin (or multiple or all pins or a portion of the pin) 218 can, for example, include a magnet 224 proximate the resilient member 226. The magnet 224 can be integral to the pin 218 or, in some implementations, the magnetic 224 is physically separate from, but adjacent, the pin 218. Additionally or alternatively, the pin (or multiple or all pins or a portion of the pin) 218 can, for example, include a ferromagnetic material 222 proximate the resilient member 226. A ferromagnetic material 222 is a material (e.g., iron based) that is attracted to magnets 224. The ferromagnetic material 222 can be integral to the pin 218 or, in some implementations, the ferromagnetic material 222 is physically separate from, but adjacent, the pin 218.

Figure 3B:
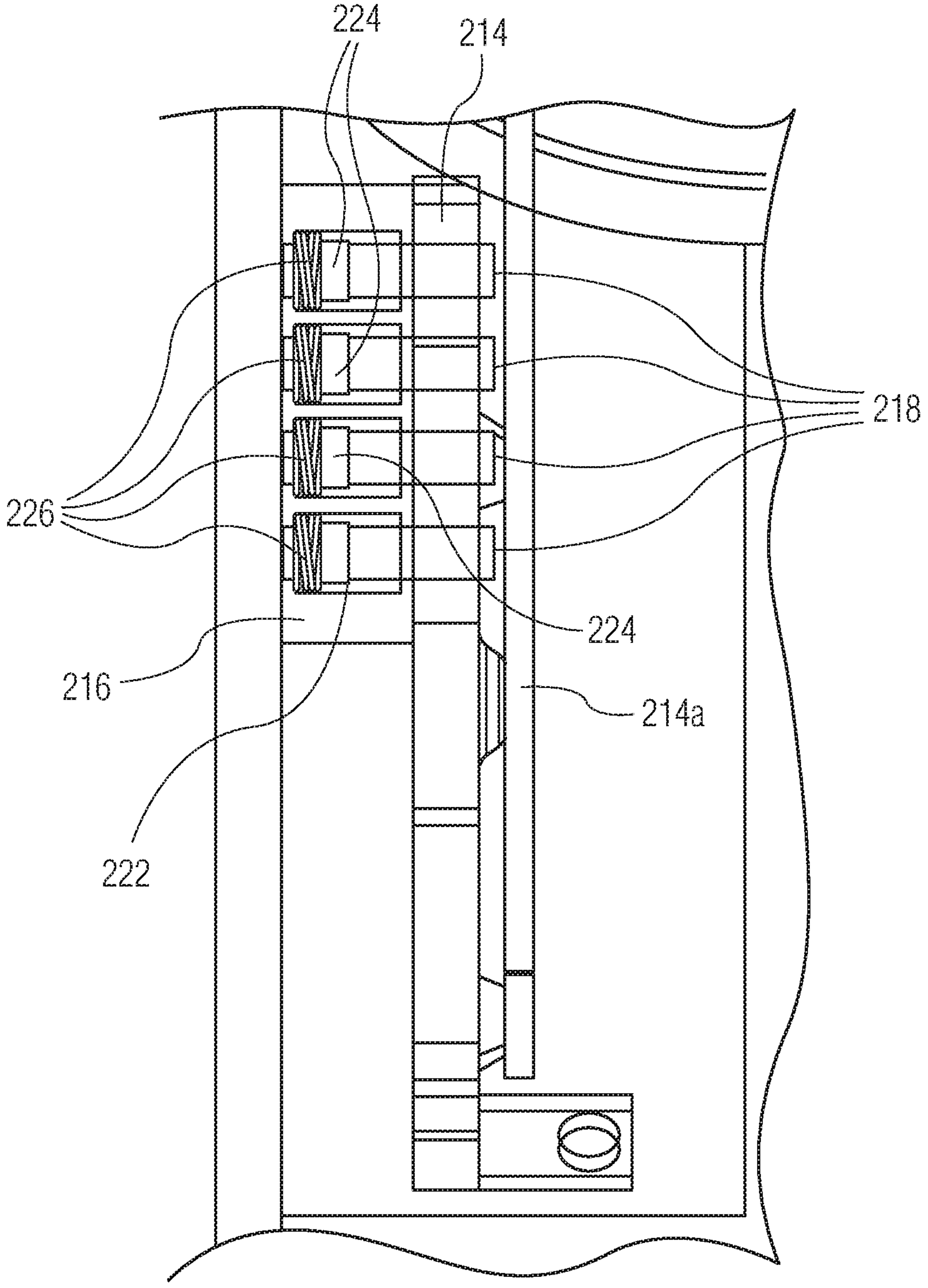
FIG. 3B is a partial front cutaway representation of the example dispenser system of FIG. 3A.

FIG. 3A is a side cutaway representation (with respect to direction 107) of the example dispenser system 100 in an open position, and FIG. 3B is a partial front cutaway representation of the example dispenser system of FIG. 3A (taken in the vicinity of line 201 on the left side 118 of the dispenser 101). As shown in FIG. 3A the hinge 214 includes one or more pin receiving openings 304. In some implementations, the pin receiving openings 304 are holes or orifices in a portion of the hinge 214*a* that aligns with the pin housing(s) 220/pins 218 when the front side 111 is in the closed positioned such that the pins 218 could slide out of the pin housings 220 and into the pin receiving openings 304. More generally, the pin receiving openings 304 are features on the hinge 214 that engage the pins 218 such that when the pins 218 and pin receiving openings 304 are engaged the hinge 214 cannot move the front side 111 to the open position.

Figure 4A:
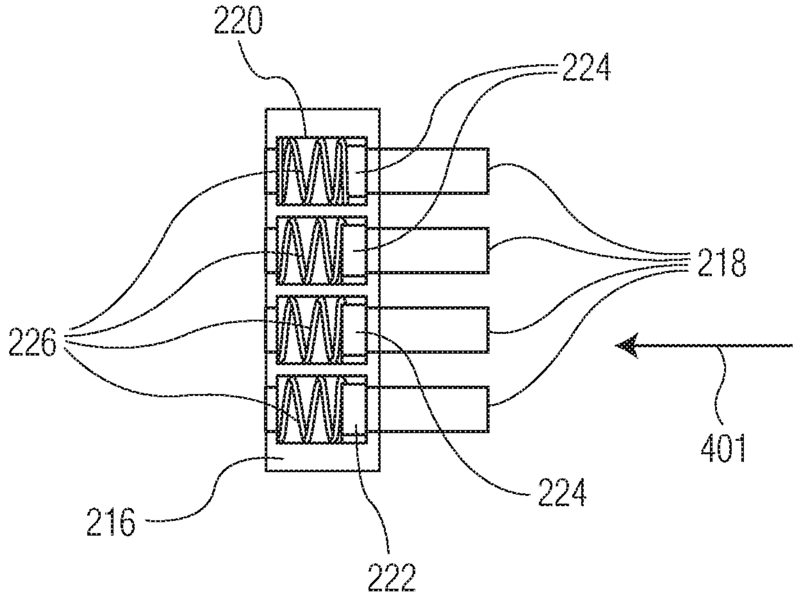
FIG. 4A is a detailed cross-sectional representation of an example locking device.
Figure 4B:
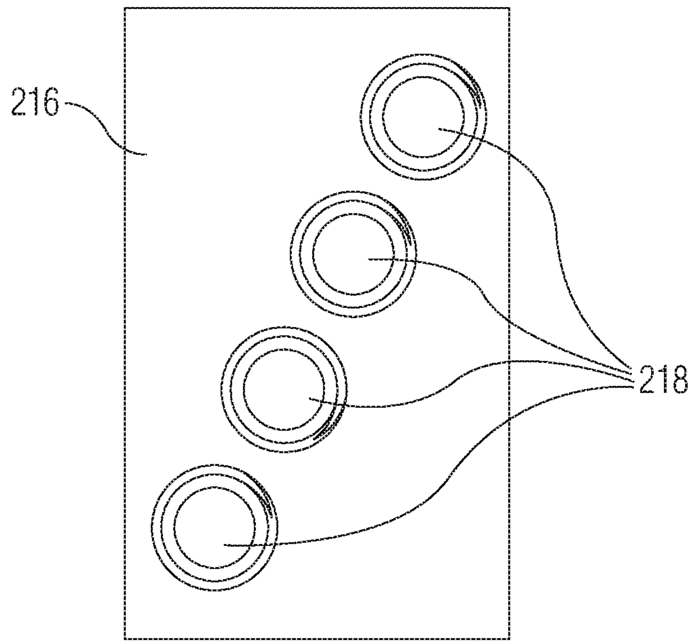
FIG. 4B is another detailed representation of the example locking device of FIG. 4A.

The first pin position describes the position of the pin(s) 218 when engaged with (e.g., inserted into) the pin receiving opening(s) 304. The pin(s) 218 are in the first pin position, for example, when the front side 111 is in the closed position to lock the dispenser 101. FIG. 2B shows the pins 218 in the first pin position. The second pin position describes the position of the pin(s) 218 when disengaged from (e.g., not inserted into) the pin receiving opening(s) 304. The pin(s) 218 are in the second pin position, for example, when the front side 111 is in the open position (and when the front side is in the closed position but the pins 218 have been withdrawn from the pin receiving openings 304 by the key 410). FIG. 3B shows the pins 218 in the second pin position. FIG. 4A is a detailed cross-sectional representation of an example locking device 216, and FIG. 4B is another detailed representation of the example locking device 214 of FIG. 4A (along axis 401).

The dispenser system 100 includes a dispenser key 410. The dispenser key 410 operates to magnetically move the pin(s) 218 from the first pin position to the second pin position to allow the front side 111 to move from the closed position to the open position. Removing the key 410 (from the first zone as descried below) allows the pins 218 to return to the first pin position. In some implementations, the dispenser key 410 is made from a ferromagnetic material, from a magnet or a combination thereof. More specifically, the key 410 is magnetically matched to the layout and composition (e.g., either a magnet or a ferromagnetic material) of the pins 218 to attract the pins 218 and cause the pins 218 to move to the second pin positon when the key 410 is placed at or near the exterior wall proximate the internal locking device 216. For example, the dispenser key 410 magnetically moves the pin(s) 218 when positioned in a first zone external to the body 104 and proximate the locking device 216.

The first zone describes the area or three-dimensional space outside of the dispenser 101 in which the magnetic attraction between the key 410 and the pin(s) 218 causes the pin(s) 218 to move to the second pin position. This first zone can be determined by computational analysis or experimentation and will be dependent, for example, on the body material, the strength and size of the magnet (of the key 410 or pin 218 based on the particular configuration) and the type and size of ferromagnetic material (of the key 410 or pin 218 based on the particular configuration).

Given that a magnet and a ferromagnetic material will attract each other, the dispenser key 410 can be magnetically matched to the pins 218 of the locking device 216 by aligning the ferromagnetic portions of the key 410 to the magnetic portions of the pin(s) 218 and/or the magnetic portions of the key 410 to the ferromagnetic portions of the pin(s) 218. As such, in some implementations, (i) the key 410 includes only ferromagnetic portions (at least with respect to alignment in the first zone with the pins 218) and the corresponding pins 218 include magnets, (ii) the key 410 includes only magnetic portions (at least with respect to alignment in the first zone with the pins 218) and the corresponding pins 218 include ferromagnetic material, or (iii) the key 410 includes magnetic and ferromagnetic portions (at least with respect to alignment in the first zone with the pins 218) and the corresponding pins 218 include magnets and ferromagnetic material. This magnetic alignment is further described below with respect to FIG. 5.

FIG. 5 is a cross-sectional representation of an example locking device 216 and an example dispenser key 410 (in the first zone); for clarity, FIG. 5 is a snapshot in time immediately before the pins 218 move to the second pin position as would result from the key 410 being in the first zone as shown in FIG. 5. In this representation, the locking device 216 includes three pins 218 with the top and bottom pins 218 including magnets 224 and the middle pin 218 including a ferromagnetic material 222. Correspondingly, the key 410 includes a magnet 414 across from and in magnetic alignment with the middle pin ferromagnetic material 222 and ferromagnetic material 412 across from and in magnetic alignment with a top and bottom pin magnets 224. In this way, the key 410 and pins 218 make matched pairs with each pin 218 (or pin 218 and proximate magnet or ferromagnetic material) being proximate (e.g., across from) its magnetic match in the key 410. A matched pair is a ferromagnetic material and a magnet or two magnets with poles aligned to attract each other.

As such, when the key 410 is placed in the first zone it will cause the pins 218 to move to the second pin position and allow the hinge 214 to move the front side 111 to the open position. More particularly, the biasing force applied by the resilient member 226 is less than a magnetic force (e.g., 1 and 1.5 Newtons) between the pin 218 and the dispenser key 410 such that the biasing force is overcome and the pin 218 allowed to move to the second pin position. When the key 410 is removed, the pins 218 will return to the first pin position, e.g., to lock the front side 111 once in the closed position.

Alternatively to each of the key 410 and pins 218 having a configuration with both ferromagnetic material and magnets as described above, the key 410 can only include ferromagnetic material 412 for its part of the matched pair and the pins 218 only include magnets for their part of the matched pair. Conversely, in some configurations, the key 410 can only include magnets 414 for its part of the matched pair and the pins 218 only include ferromagnetic material for their part of the matched pair. Further, in some implementations, the key 410 can only include magnets 414 for its part of the matched pair and the pins 218 also only include magnets (arranged with opposite polarity) for their part of the matched pair. Generally, any number and order of matched pairs (and any configuration of matched pairs) can be used in the key 410 and locking device 216. This can allow for a number of different key combinations such that particular keys 410 can be required to open particular dispensers 101 enabling dispenser security.

Embodiments

Embodiment 1. A dispenser system for dispensing consumable product comprising a body comprising a front side and a back side with the front side movably attached to the back side by a hinge, wherein the hinge includes one or more pin receiving openings and the hinge is configured to move the front side between an open position and a closed position; and a locking device including one or more pins and a pin housing for each of the one more pins and is configured to hold the one or more pins in spaced relation and allow respective movement of the one or more pins between a first pin position and a second pin position; and wherein when in the closed position the one or more pins are in the first pin position and engage the one or more pin receiving openings in the hinge and when in the open position the one or more pins are in the second pin position and do not engage the one or more pin receiving openings in the hinge; and a dispenser key configured to magnetically move the one or more pins from the first pin position to the second pin position to allow the front side to move from the closed position to the open position.

Embodiment 2. The dispenser system of embodiment 1, wherein one of the one or more pins comprises a magnet.

Embodiment 3. The dispenser system of any preceding embodiment, wherein one of the one or more pins comprises a ferromagnetic material.

Embodiment 4. The dispenser system of any preceding embodiment, wherein at least a portion of the dispenser key is magnetic.

Embodiment 5. The dispenser system of any preceding embodiment, wherein at least a portion of the dispenser key is ferromagnetic.

Embodiment 6. The dispenser system of any preceding embodiment, wherein the dispenser key is configured to magnetically move one or more ferrous pins when positioned in a first zone external to the body and proximate the locking device.

Embodiment 7. The dispenser system of embodiment 1, wherein when the dispenser key is in the first zone the ferromagnetic portion of the dispenser key lines up with the one of the one or more pins that is the magnet and the one of the one or more pins that is ferromagnetic lines up with the portion of the dispenser key that is magnetic.

Embodiment 8. The dispenser system of any preceding embodiment, wherein the locking device includes a resilient member in each pin housing and is configured to bias the respective one or more pins to the first pin position.

Embodiment 9. The dispenser of embodiment 8 wherein the resilient member has a biasing force that is less than a magnetic force between the respective one or more pins and the dispenser key when the dispenser key is in the first zone.

Embodiment 10. The dispenser of claim 9, wherein the magnetic force is between is between 1 and 1.5 Newtons.

Embodiment 11. A method of latching a dispenser comprising magnetically coupling a dispenser key to a locking device in the dispenser through an exterior of the dispenser to move pins in the locking device from a first pin position in which the pins engage a hinge on a door of the dispenser to a second pin position in which the pins do not engage the hinge; and opening the door of the dispenser.

Embodiment 12. The method of embodiment 11, wherein at least one of the pins comprises a magnet and at least a portion of the dispenser key is ferromagnetic.

Embodiment 13. The method of embodiments 11 or 12, wherein magnetically coupling a dispenser key to a locking device comprises aligning the at least one of the pins that comprises a magnet to the at least a portion of the dispenser key that is ferromagnetic.

Embodiment 14. The method of any of embodiments 11-13, comprising magnetically decoupling the dispenser key to the locking device to move the pins from the second position to the first position.

Embodiment 15. The method of any of embodiments 11-14, wherein the locking device includes a resilient member configured to bias the pins to the first pin position.

Embodiment 16. The method of any of embodiments 11-15, wherein the locking device includes at least four pins.

Embodiment 17. The method of any of embodiments 11-16, wherein all but one of the pins comprises a magnet.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements. While this specification contains many specific implementation details, these should not be construed as limitations on the scope of any invention or of what may be claimed, but rather as descriptions of features that may be specific to particular embodiments of particular inventions.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination

What is claimed is:

1. A dispenser system for dispensing consumable product comprising:

a body comprising:

a front side and a back side with the front side movably attached to the back side by a hinge, wherein the hinge is connected to the front side on one end and the back side on an other end and includes one or more pin receiving openings and the hinge is configured to move the front side between an open position and a closed position in a clam shell type movement; and wherein the hinge and the one or more pin receiving openings change locations inside the body in response to the dispenser being in an open or closed state;

a locking device including one or more pins and a pin housing for each of the one more pins and is configured to hold the one or more pins in spaced relation and allow respective linear movement of the one or more pins between a first pin position and a second pin position different from the first pin position; and wherein when in the closed position the one or more pins are in the first pin position and are inserted into the one or more pin receiving openings in the hinge and when in the open position the one or more pins are in the second pin position and do not engage the one or more pin receiving openings in the hinge; and a dispenser key configured to magnetically move the one or more pins from the first pin position to the second pin position to allow the front side to move from the closed position to the open position.

2. The dispenser system of claim 1, wherein one of the one or more pins comprises a magnet.

3. The dispenser system of claim 2, wherein one of the one or more pins comprises a ferromagnetic material.

4. The dispenser system of claim 3, wherein at least a portion of the dispenser key is magnetic.

5. The dispenser system of claim 4, wherein at least a portion of the dispenser key is ferromagnetic.

6. The dispenser system of claim 5, wherein the dispenser key is configured to magnetically move one or more ferrous pins when positioned in a first zone external to the body and proximate the locking device.

7. The dispenser system of claim 1, wherein when the dispenser key is in the first zone the ferromagnetic portion of the dispenser key lines up with the one of the one or more pins that is the magnet and the one of the one or more pins that is ferromagnetic lines up with the portion of the dispenser key that is magnetic.

8. The dispenser system of claim 1, wherein the locking device includes a resilient member in each pin housing and is configured to bias the respective one or more pins to the first pin position.

9. The dispenser system of claim 8 wherein the resilient member has a biasing force that is less than a magnetic force between the respective one or more pins and the dispenser key when the dispenser key is in the first zone.

10. The dispenser system of claim 9, wherein the magnetic force is between 1 and 1.5 Newtons.

11. A dispenser comprising:

a body comprising:

a front side and a back side with the front side movably attached to the back side by a hinge, wherein the hinge includes a pin receiving opening and the hinge is configured to move the front side between an open position and a close position in a clam shell type movement; and wherein the hinge and the pin receiving opening change locations inside the body in response to the dispenser being in an open or closed state;

a locking device including a ferrous pin and a pin housing for the ferrous pin and being configured to hold the ferrous pin and allow linear movement of the ferrous pin between a first pin position and a second pin position different from the first position; and wherein when in the closed position the ferrous pin is in the first pin position and are is inserted into the pin receiving opening in the hinge and when in the open position the ferrous pin is in the second pin position and does not engage the pin receiving opening in the hinge.

* * * * *